US008278620B2

(12) United States Patent
Schwartz et al.

(10) Patent No.: US 8,278,620 B2
(45) Date of Patent: Oct. 2, 2012

(54) METHODS FOR CALIBRATION OF USABLE FRAGMENTATION ENERGY IN MASS SPECTROMETRY

(75) Inventors: Jae C. Schwartz, Gilroy, CA (US); Philip M. Remes, Berkeley, CA (US)

(73) Assignee: Thermo Finnigan LLC, San Jose, CA (US)

( * ) Notice: Subject to any disclaimer, the term of this patent is extended or adjusted under 35 U.S.C. 154(b) by 149 days.

(21) Appl. No.: 12/772,875

(22) Filed: May 3, 2010

(65) Prior Publication Data

US 2011/0266426 A1 Nov. 3, 2011

(51) Int. Cl.
*B01D 59/44* (2006.01)

(52) U.S. Cl. ...................... 250/282; 250/283; 250/252.1

(58) Field of Classification Search .................. 250/282
See application file for complete search history.

(56) References Cited

U.S. PATENT DOCUMENTS 5,298,746 A 3/1994 Franzen et al.
5,404,011 A 4/1995 Wells et al.
6,124,591 A 9/2000 Schwartz et al.
6,683,303 B2 1/2004 Yoshinari et al.
6,949,743 B1 9/2005 Schwartz
7,232,993 B1 * 6/2007 Specht et al. ................ 250/292
2006/0141516 A1 6/2006 Kobold et al.
2007/0158546 A1 * 7/2007 Lock et al. .................... 250/282
2009/0212209 A1 * 8/2009 Quarmby ...................... 250/283

* cited by examiner

*Primary Examiner* — Phillip A Johnston
(74) *Attorney, Agent, or Firm* — Thomas F. Cooney

(57) ABSTRACT

A method of calibrating ion collision energy used in a mass spectrometer, comprises: (a) obtaining fragment ion yield data for each of a plurality of precursor ion populations having respective mass-to-charge ratios at each of a plurality of settings of a fragmentation-energy-related variable; (b) locating, for each mass-to-charge ratio, reference values of the fragmentation-energy-related variable, each reference value corresponding to a respective reference feature of the ion yield data at the mass-to-charge ratio; (c) determining, from the plurality of locating steps, the variation, with mass-to-charge-ratio, of each of the reference values of the fragmentation-energy-related variable; (d) associating each of the reference values of the fragmentation-energy related variable with respective reference values of a dimensionless useable-fragmentation-energy variable; and (e) storing parameters describing the variation of each of the reference values of the fragmentation-energy-related variable with mass-to-charge ratio, wherein the parameters comprise coefficients of at least one non-linear equation.

25 Claims, 8 Drawing Sheets

600

METHODS FOR CALIBRATION OF USABLE FRAGMENTATION ENERGY IN MASS SPECTROMETRY

FIELD OF THE INVENTION

This invention relates generally to methods of ion fragmentation in mass spectrometers and more particularly to methods of calibrating and determining fragmentation excitation energy in terms of a mass variable.

BACKGROUND OF THE INVENTION

As is well known in the field of life sciences, tandem mass spectrometry (MS/MS) is a powerful tool for structural elucidation of analytes, and in its many permutations, MS/MS is commonly used to dissociate and analyze such diverse species as peptides, proteins, small molecule drug compounds, synthetic polymers, and metabolites. The most common method of causing ion fragmentation in MS/MS analyses is collision induced dissociation (CID), in which a population of analyte precursor ions are accelerated into target neutral gas molecules such as nitrogen ($N_2$) or argon (Ar), causing the precursors to gain internal energy and fragment. The ionic fragments ions are analyzed so as to provide useful information regarding the structure of the precursor ion.

When performing MS/MS in an ion trap, there are various ways to activate ions in order to cause ion fragmentation by means of collision induced dissociation or otherwise. The most efficient and widely used method involves collision-induced dissociation by means of a resonance excitation process. This method, which may be referred to as RE-CID, utilizes an auxiliary alternating current voltage (AC) that is applied to the ion trap in addition to the main RF trapping voltage. This auxiliary voltage typically has relatively low amplitude (on the order of 1 Volt (V)) and duration on the order of tens of milliseconds. The frequency of this auxiliary voltage is chosen to match an ion's frequency of motion, which in turn is determined by the main trapping field amplitude and the ion's mass-to-charge ratio (m/z). As a consequence of the ion's motion being in resonance with the applied voltage, the ion takes up energy from this voltage, and its amplitude of motion grows.

FIG. 1A schematically illustrates a resonant excitation process, using a quadrupole ion trap as an example. In FIG. 1A, a quadrupole ion trap 100 comprises a ring electrode 102 and end cap electrodes 104*a*, 104*b*, as is known in the art. Without application of a supplementary AC voltage, the oscillating RF quadrupole field generated within the trap 100 causes an ion 106 to remain trapped with a certain kinetic energy state represented by the dashed arrow. In this particular energy state, the kinetic energy of the ion 106 is generally insufficient to cause fragmentation of the ion during occasional collisions with molecules 108 of an inert bath gas. If a supplementary resonance voltage of the proper frequency is subsequently continuously applied, then, in an ideal quadrupole field, the ion's amplitude will grow linearly with time, as is indicated by the solid spiral arrow in FIG. 1A. The ion's kinetic energy increases with the square of the ion's amplitude of motion and, therefore any collisions which occur with neutral gas molecules (or other ions) become increasingly energetic. At some point during this process, the collisions which occur deposit enough energy into the molecular bonds of the ion in order to cause those bonds to break, and the ion to fragment. As one example, the ion 106 may fragment into a smaller ion 110 and a neutral molecule 112.

A variant of the CID technique, referred to as pulsed-q dissociation (PQD or, alternatively, PQ-CID) and described in U.S. Pat. No. 6,949,743 to Schwartz, may be employed in place of conventional CID by resonance excitation. In the PQD technique, the RF trapping voltage is increased prior to or during the period of kinetic excitation, and then reduced after a short delay period following termination of the excitation voltage in order to retain relatively low mass product ions in the trap. The PQD technique provides for more energetic collisional activation of target ions than does the original resonance excitation CID technique, while still retaining the lower mass product ions for subsequent analysis.

FIG. 1B schematically illustrates yet a third known method of providing collision induced dissociation. In this method, selected ions are temporarily stored in a multipole ion storage device 152, which may, for instance, comprise a quadrupole ion trap. At a certain time, an electrical potential on a gate electrode assembly 154 is changed so as to accelerate the selected ions 106 out of the ion storage device and into a collision cell 156 containing molecules 108 of an inert target gas. The ions are accelerated so as to collide with the target molecules at a kinetic energy that is determined by the difference in the potential offsets between the collision cell and the storage device. This method may be referred to by the acronyms HCD or HCID.

Photo-dissociation is another commonly employed fragmentation method in the field of mass spectrometry. For instance, in the technique known as Infrared Multiphoton Dissociation (IRMPD), infrared light from a laser is introduced into a vacuum chamber containing ions, such as an ion trap, so as to excite certain vibrational modes and thereby cause fragmentation. The IRMPD technique only works well under low pressure (high-vacuum) conditions. At higher pressures, ultraviolet light (for instance, from an ultraviolet lamp or a laser) can be used to excite electronic states within a molecule or ion, and thereby cause dissociation (or ionization). The infrared or UV light may be applied either continuously (that is, as a continuous wave) or else pulsed or chopped over a certain time period. Thus, in these photo-dissociation techniques, the power of the laser light or the energy per pulse is an important experimental variable as are, also, the light wavelength and the total time duration of exposure.

One remarkable aspect of the various ion fragmentation techniques is the fact that they are applicable to such a wide variety of precursors; masses, charges, shapes, and ion stabilities. However, to achieve the most efficient conversion of precursor ions to product ions, certain experimental parameters must be optimized, such as the collision energy, the target gas pressure, laser power or energy per pulse (for IRMPD and APPI) and possibly target gas constituents. Precursor ions of different size and structure have different internal energy requirements to maximize their unimolecular dissociation rates, and in general, collision energy must be increased as the mass of the precursor goes up and the charge of the precursor goes down. To maximize experimental throughput, a fragmentation energy dependence on mass and charge is typically calibrated and stored in the instrument, so that the appropriate parameters may be automatically varied in a data-dependent manner. The object of this disclosure is to provide an improved fragmentation energy calibration method that increases the likelihood that a given user-input fragmentation energy setting will appropriately fragment a precursor of a given mass and charge.

SUMMARY OF THE INVENTION

Methods of calibrating the MS/MS fragmentation energy are provided which utilize a range of "useable" fragmentation energies (UCE) at each mass. According to some embodiments, two reference points may be fixed at each mass respectively corresponding to, for example, the onset of fragmentation and the optimum of fragmentation. These two points set the slope and intercept of the graph of the linear equation $$V=(UCE\times \text{slope(mass)})+\text{intercept(mass)}$$

for a particular mass, where V is a collision-energy-related variable (generally an instrumental voltage) and the dimensionless UCE variable represents a proportion, possibly as a percentage, of a range of the fragmentation-energy-related variable corresponding to useable fragmentation energy range for ions of the particular mass.

Accordingly, in a first aspect, there is provided method of calibrating ion fragmentation energy used for fragmenting ions in a mass spectrometer, comprising: (a) obtaining fragment ion yield data for each of a plurality of precursor ion populations having respective mass-to-charge ratios at each of a plurality of settings of a fragmentation-energy-related variable; (b) locating, for each mass-to-charge ratio, reference values of the fragmentation-energy-related variable, each reference value corresponding to a respective reference feature of the ion yield data at the mass-to-charge ratio; (c) determining, from the plurality of locating steps, the variation, with mass-to-charge-ratio, of each of the reference values of the fragmentation-energy-related variable; (d) associating each of the reference values of the fragmentation-energy related variable with respective reference values of a dimensionless useable-fragmentation-energy variable; and (e) storing parameters describing the variation of each of the reference values of the fragmentation-energy-related variable with mass-to-charge ratio, wherein the parameters comprise coefficients of at least one non-linear equation.

In a second aspect, there is provided a method of fragmenting precursor ions comprising a plurality of precursor ion mass-to-charge ratios so as to create fragment ions in a mass spectrometer, comprising: (a) choosing a value of a useable fragmentation energy variable to be referenced for the fragmenting the precursor ions, the useable fragmentation energy value representing a proportion or percentage of a range of values of a fragmentation-energy-related variable, said range varying non-linearly with precursor ion mass-to-charge ratio; (b) isolating a precursor ion of a particular mass-to-charge ratio in the mass spectrometer; (c) determining a value of a fragmentation-energy-related variable that corresponds to the chosen useable fragmentation energy value at the particular mass-to-charge ratio; (d) generating fragment or product ions from the precursor ion of the particular mass-to-charge ratio in the mass spectrometer using a control setting of the mass spectrometer corresponding to the determined fragmentation-energy-related variable; and (e) mass analyzing the fragment or product ions using the mass spectrometer.

In a third aspect, there is provided a method of calibrating ion fragmentation energy used for fragmenting ions in a mass spectrometer, comprising: (a) obtaining fragment ion yield data for each of a plurality of precursor ion populations having respective values of a mass variable at each of a plurality of settings of a fragmentation-energy-related variable; (b) locating, for each value of the mass variable, reference values of the fragmentation-energy-related variable, each reference value corresponding to a respective reference feature of the fragment ion yield data obtained at the value of the mass variable; (c) determining, from the plurality of locating steps, the variation, with the mass variable, of each of the reference values of the fragmentation-energy-related variable; (d) associating each of the reference values of the fragmentation-energy related variable located for each value of the mass variable with respective reference values of a dimensionless useable-fragmentation-energy variable so as to set up, for each value of the mass variable, a relationship between the useable fragmentation energy variable and the fragmentation-energy related variable; and (e) storing parameters describing the variation of each of the reference values of the fragmentation-energy-related variable with the mass variable, wherein a zero value of the useable fragmentation energy variable corresponds to a non-zero value of the fragmentation-energy related variable for at least one value of the mass variable.

The fragmentation-energy-related variable may comprise an amplitude of an auxiliary alternating current voltage that is applied to an ion trap. Under such circumstance, the auxiliary alternating current voltage may be applied in conjunction with pulsed-q dissociation of the precursor ions. Alternatively, the fragmentation-energy-related variable may comprise an accelerating voltage that propels the precursor ions into a collision cell or the energy-per-pulse or continuous-wave power of a laser light to which the precursor ions are exposed.

Various embodiments of methods for calibrating may include additional steps of: (a1) determining, for each mass-to-charge ratio or other mass variable, a respective model curve relating at least a portion of the fragment ion yield data to the fragmentation-energy-related variable, and (a2) determining at least one reference feature of the fragment ion yield data obtained at each value of the mass-to-charge ratio or mass variable from parameters relating to the respective model curve. In such cases, separate reference values of the fragmentation-energy-related variable that are located for each mass-to-charge ratio or mass variable may respectively correspond to a mean and a standard deviation of the model curve determined for the mass-to-charge ratio or other mass variable. Alternatively, a reference value of the fragmentation-energy-related variable that is located for each mass-to-charge ratio or other mass variable may correspond to a threshold value of the model curve determined for the mass-to-charge ratio or mass variable.

In various embodiments of methods for calibrating, the step of storing parameters describing the variation of each of the reference values of the fragmentation-energy-related variable with mass-to-charge ratio or other mass variable may comprise storing at least one parameter that is a coefficient or exponent of a power law equation or may comprise storing parameters that are coefficients of at least one polynomial equation.

This method alleviates problems associated with current methods, especially PQD and collision-cell CID, where efficient MS/MS is observed over only a very narrow range of relative collision energies.

BRIEF DESCRIPTION OF THE DRAWINGS

The above noted and various other aspects of the present invention will become apparent from the following description which is given by way of example only and with reference to the accompanying drawings, not drawn to scale, in which.

DETAILED DESCRIPTION

Figure 1A:
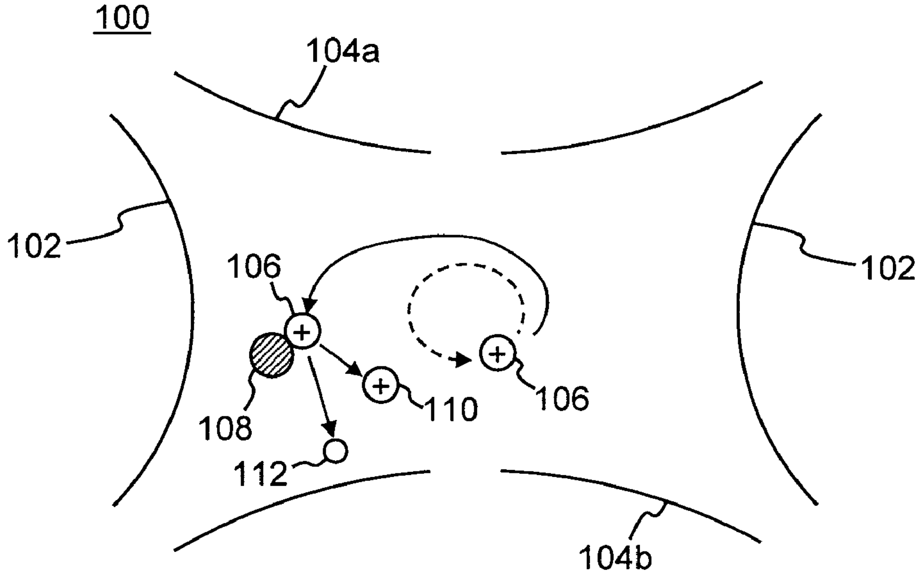
FIG. 1A (Prior Art)
FIG. 1A is a schematic illustration of collision induced dissociation of ions by resonant excitation in a quadrupole ion trap.
Figure 1B:
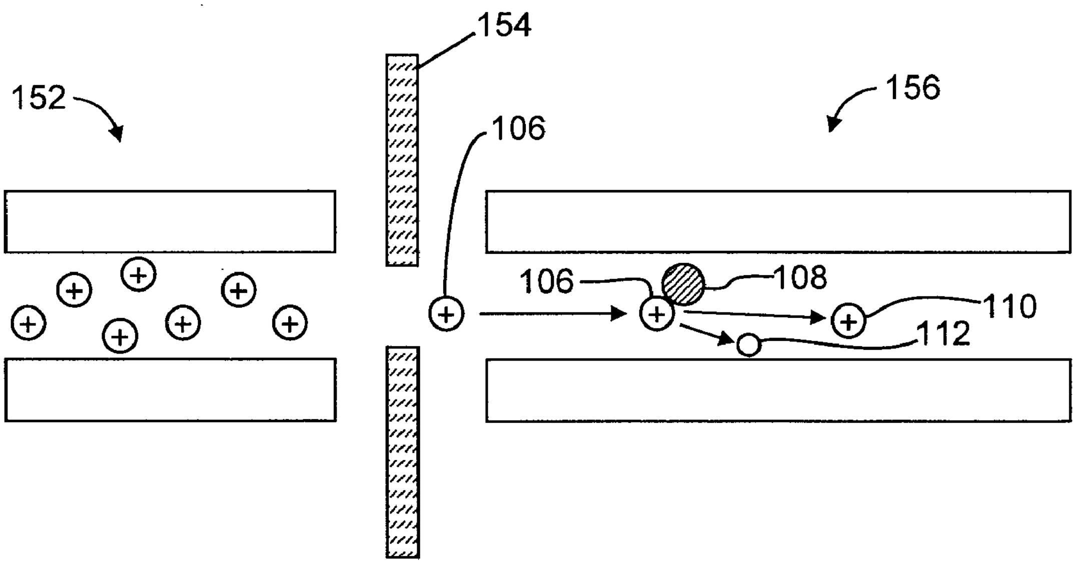
FIG. 1B (Prior Art)
FIG. 1B is a schematic illustration of collision induced dissociation of ions by acceleration of the ions from an ion storage device into a collision cell.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. The particular features and advantages of the invention will become more apparent with reference to the appended FIGS. 2-7, taken in conjunction with the following description.

It is generally observed that, as collision energy is increased from a low value, a threshold or onset collision energy will be observed at which the number of observed fragment ions rapidly increases from an initial value of nil. This yield of fragment ions is further observed to increase, with increasing collision energy, up to some maximum value. Further increase in collision energy beyond that corresponding to the maximum corresponds to diminishing fragment yield which decreases back to essentially zero yield at some energy. U.S. Pat. No. 6,124,591, in the names of inventors Schwartz et al. and assigned to the assignee of the present invention discloses a linear calibration of an optimum or "best" collision energy versus mass to charge ratio (m/z). In practice, a measure of the magnitude of the collision energy is exposed to a mass spectrometer end-user as a "normalized collision energy" (NCE, also referred to by the acronym NRCE for "normalized relative collision energy"). The slope and intercept of this relationship are derived from the points, given here as co-ordinate pairs, $((m/z)_1, (V_1/\text{BESTCE}))$ and $((m/z)_2, (V_2/\text{BESTCE}))$, where $(m/z)_1$ and $(m/z)_2$ are a first and second precursor ion mass-to-charge ratio, $V_1$ and $V_2$ are voltage settings which correspond to the respective optimum collision energies, and the parameter "BESTCE" is an arbitrary number which is presented as percentage (or percentage×100) corresponding to the pre-determined "best collision energy value", that is to say, the collision energy that gives the optimum fragment yield. The percentage value, as used here, is a percentage of the maximum instrumentally allowable collision energy at the particular (m/z) under consideration. For instance, let BESTCE be equal to 30%. The collision energy (volts) is then set by the equation, $$V = NCE \times (\text{slope} \times \text{mass} + \text{intercept})$$

where NCE is a number from 0%-100%. Thus if the user sets NCE=30%, the "best" voltages (corresponding maximum fragmentation) from a prior calibration will be used for any given entered m/z. Any other NCE gives an actual collision energy scaled by the factor NCE/30 relative to this best voltage. In addition, the slope and intercepts will be unique to each individual mass spectrometer system such that the same optimum dissociation conditions are accomplished for all systems.

Figure 3:
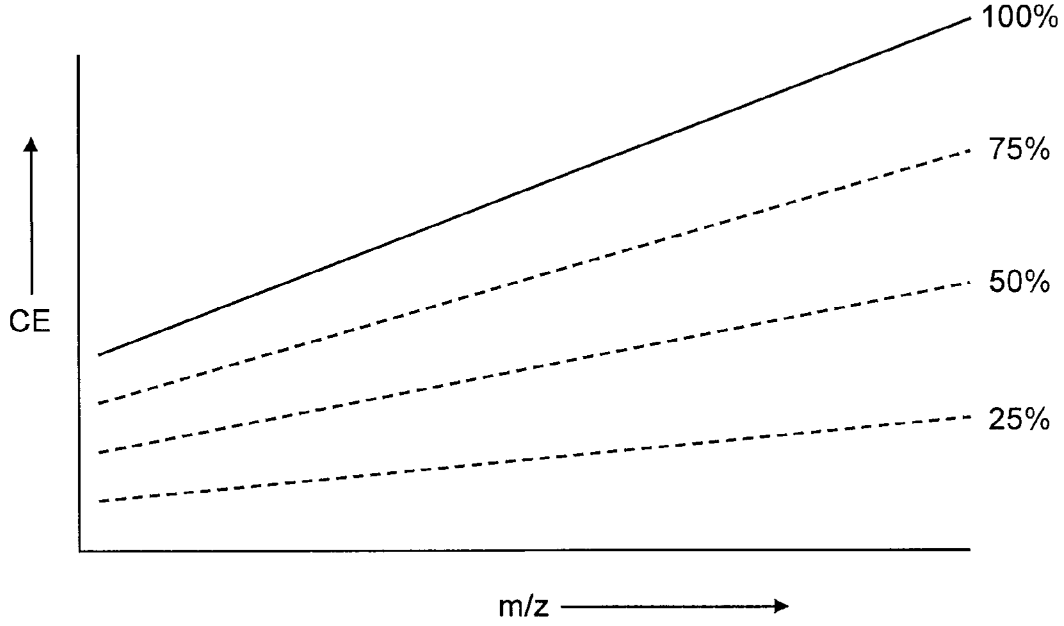
FIG. 3 is a schematic graphical depiction of a known normalized relative collision energy scheme.

FIG. 3 is a schematic graphical depiction of the normalized relative collision energy scheme described above. The actual applied collision energy is plotted on the ordinate. However, mass spectrometer end users generally only receive exposure to NCE values, three isopleths of which (i.e., 100%, 75%, 50% and 25%) are shown in FIG. 3. Although the actual applied collision energy may be varied at any given m/z by changing the NCE within the range 0% to 100%, any given mass analysis will generally follow a single NCE isopleth. The normalized relative collision energy provides an approach to a standardized mass spectrometry analysis and reporting procedure that attempts to normalize out the primary variations in optimal collision energy voltage for differing ions and instrumental variations.

Figure 2:
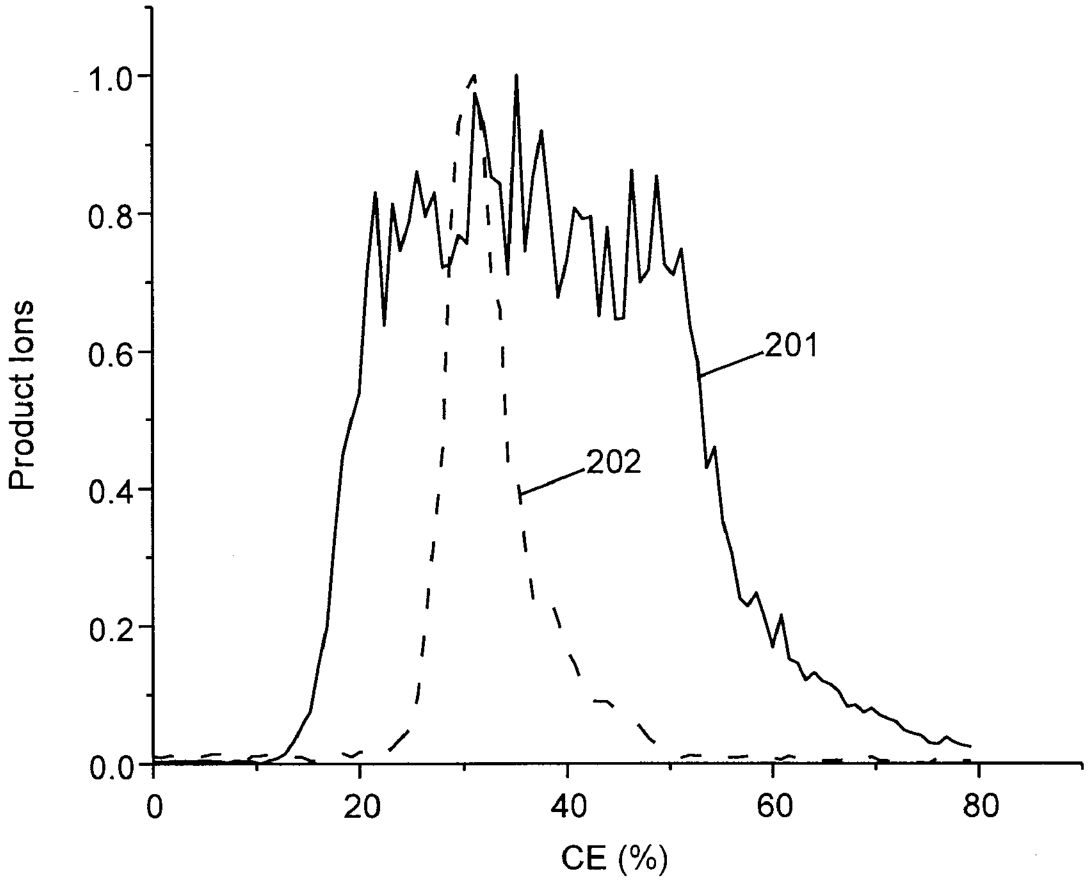
FIG. 2 is a graph of relative number of detected product ions versus normalized collision energy for product ions generated by resonance excitation (solid line) and by pulsed-q dissociation (dashed line).

The normalized relative collision energy method performs very well for CID as performed by resonant excitation in a quadrupole ion trap mass spectrometer (QIT), for which high quality MS/MS spectra are produced over the NCE range 25%-50% for most precursor ions (e.g., see curve 201 of FIG. 2). The general characteristic of this type of MS/MS is that after an initially rapid increase in total number of fragment ions just after the onset of fragmentation, the fragment yield then stays relatively constant for a wide range of collision energies. In other words, the profile of fragment ion yield versus collision energy is relatively flat-topped (see curve 201). For other MS/MS dissociation techniques, such as pulsed-q dissociation (PQD) or traditional collision-cell-type CID (also, often called HCD), the allowable window of relative collision energies is much narrower (e.g., see curve 202 of FIG. 2). A disadvantage of the linear NCE calibration, in this case, is the high sensitivity of the fragmentation to the NCE parameter. One reason for this problem is that the absolute magnitude of the collision energy in volts is larger for these latter techniques, being as they are much more energetically impulsive (internal energy is added over a much shorter time-scale than CID in a QIT). Therefore a change of 1% NCE corresponds to a much larger change in voltage in these cases.

Figure 4:
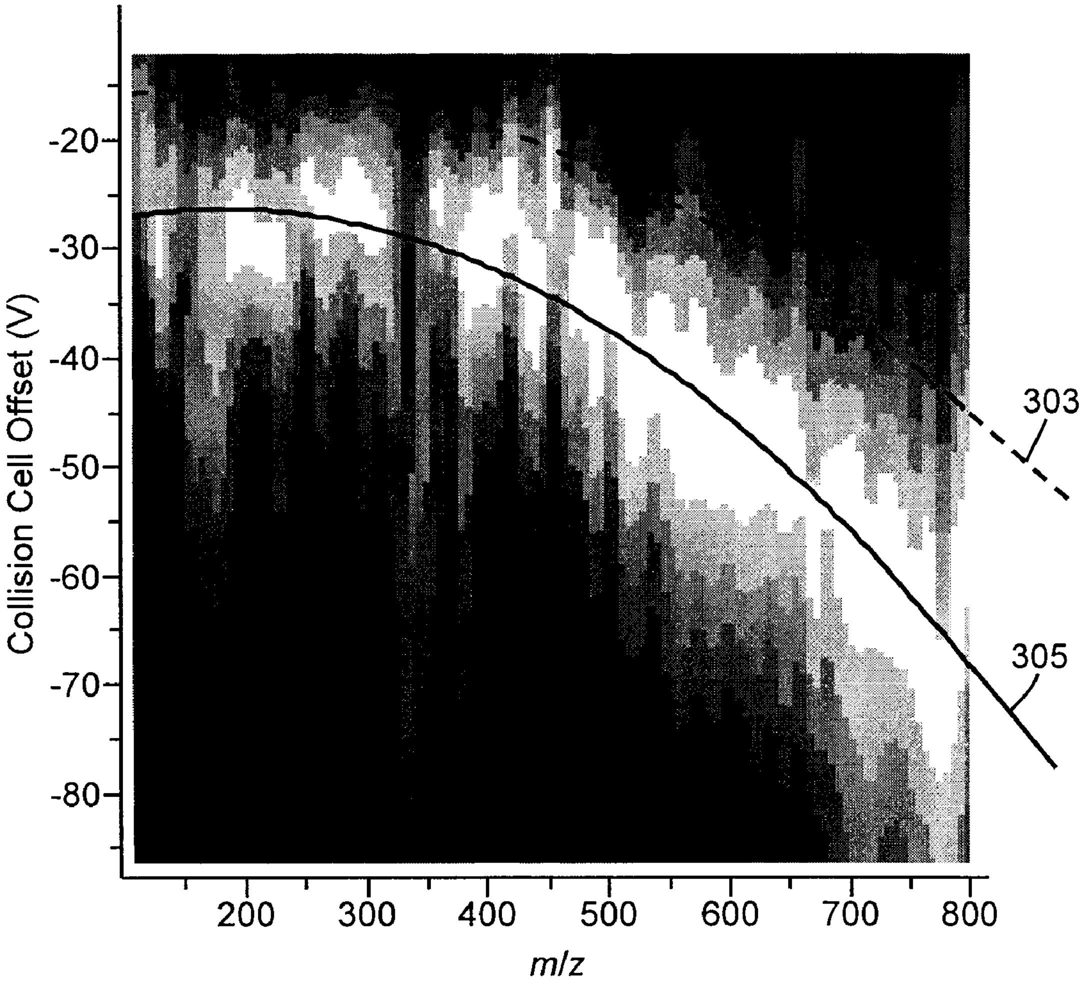
FIG. 4 is a contour of normalized detected fragment intensity versus collision cell offset voltage, $q_{00}$, and the mass-to-charge ratio (m/z) of precursor ions formed from a myoglobin digest.

A solution to this high NCE sensitivity problem is to implement a scale whose lower bound and possibly width changes with mass, such that the zero-point (minimum allowable voltage) and the voltage range may change with mass. Such a moveable collision energy or fragmentation energy scale is referred to herein as "useable collision energy" (UCE). To illustrate this process, consider FIG. 4, which is a plot of yield of fragment ions versus a measure of absolute collision energy (denoted in Volts) and mass-to-charge ratio, m/z. In FIG. 4, the various shaded regions—from darkest to lightest—represent product ion yields, respectively, of 0-0.125, 0.125-0.250, 0.250-0.375, 0.375-0.500, 0.500-0.625, 0.625-0.750, 0.750-0.875 and 0.875-1.000, all such numbers being normalized to the maximum observed product ion yield.

From inspection of FIG. 4, a "useable" fragmentation energy range might be described at each mass, such that 0% corresponds to the onset of fragmentation, represented by curve 303, and 30% corresponds to the optimum amount of fragmentation, represented by curve 305. By contrast, the previously described normalized collision energy technique only makes use of collision energy information corresponding optimal (maximum yield) fragmentation. As a result, the 0% point of a normalized collision energy scale always corresponds to zero volts, which, from a practical standpoint, is unrealistically low in many instances. The use of both data points noted above—the point corresponding to fragmentation onset and the point corresponding to optimal fragmentation—at every m/z, gives a UCE scale having a significantly broader range of useable values than are provide by previous methods.

For the experimental results illustrated in FIG. 3, it appears that, for each isopleth, the applied voltage, $V_{CE}$ (a measure of collision energy) may be roughly approximated by an equation of the form $$V_{CE}=a(m/z)^2+b(m/z)+c \quad \text{Eq. 1}$$

where the parameters a, b and c are fit coefficients. For instance, the curves 303 and 305 may be respectively approximated by the two equations $$V_{CE}^0=a_0(m/z)^2+b_0(m/z)+c_0 \quad \text{Eq. 2a}$$

and $$V_{CE}^{max}=a_1(m/z)^2+b_1(m/z)+c_1 \quad \text{Eq. 2b}$$

in which $V_{CE}^0$ and $V_{CE}^{max}$ are the collision energy voltages for the fitted fragmentation onset and fragmentation maximum curves as functions of the mass variable, m/z, respectively, and $a_0$, $b_0$, $c_0$, $a_1$, $b_1$ and $c_1$ are the appropriate fit coefficients. Alternatively, other mathematical relationships that describe V in terms of mass could be used, such as linear, power law etc.

Figure 5:
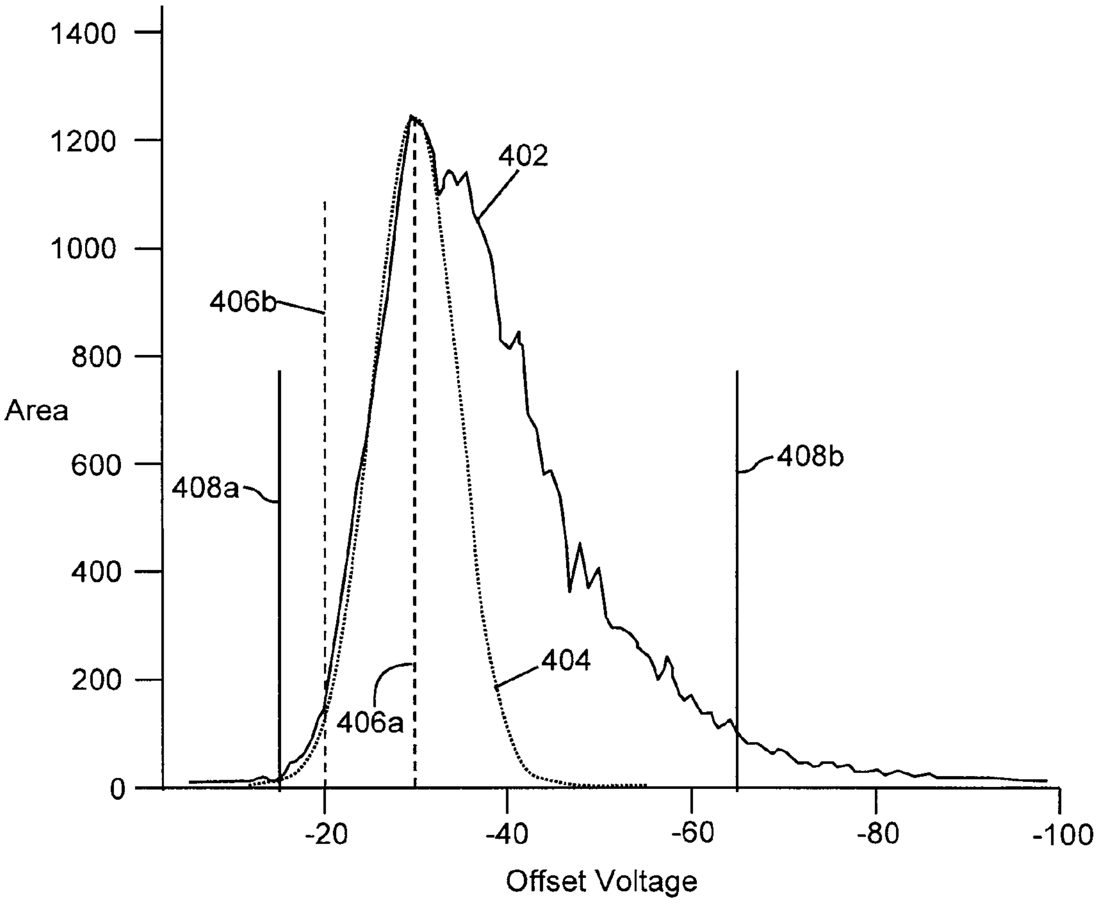
FIG. 5 is a graph showing a method of calibration of UCE range for m/z 195 caffeine in accordance with some embodiments of the present teachings.

For consistency and compatibility with the existing NCE-type treatment, it is desirable that the useable collision energy voltage setting, V, is cast in the form $$V_{CE}=UCE\times(\text{Slope}_{m/z})+(\text{Intercept}_{m/z})$$

in which subscripts are utilized to indicate that the values of slope and intercept are (m/z)-dependent. At any given (m/z), the values of "slope" and "intercept" may be calculated according to the following example and with reference to FIG. 5, which illustrates measured fragmentation results derived from m/z 195 caffeine. The first step is to perform an instrument calibration for precursor ions at each of several known mass values, in which a measure of the yield of product or fragment ions is determined as a function of an instrumental variable that may be taken as a measure of introduced fragmentation energy. The variable that measures the yield of product or fragment ions may a simple operational measurement variable, such as an integrated area under the mass spectral curve or curves that correspond to the ions. The variable that measures fragmentation energy may be an instrumental voltage, V, which is used to accelerate the precursor ions. Alternatively, the variable that measures fragmentation energy may be a laser power (of continuous-wave laser emission) or laser energy per pulse (for pulsed laser emission) if photo-dissociation is employed as the fragmentation technique. Curve 402 in FIG. 5 provides an example of such experimental results used to generate a calibration at one particular mass. A complete calibration would correspond to a family of such experimental results obtained at a variety of masses.

Dotted-line curve 404 in FIG. 5 is a curve fit—for instance, a Gaussian curve fit—to the leading edge of the experimental data of curve 402. Using the mean and standard deviation parameters associated with the fit peak, the location of the optimal or maximum fragmentation voltage and of a point on the leading edge may be reproducibly determined. These are indicated in FIG. 5 by the vertical dashed lines 406*a* and 406*b*, respectively. Line 406*a* corresponds to the mean of the fit peak and line 406*b* is set at a certain number, s, of standard deviations away from the mean, in the direction of the leading edge. An arbitrary respective UCE value (a reference value), as a percentage, may then be associated with each of these abscissa values. As but one non-limiting example, assume, for instance, that UCE values of 10% and 30% are assigned to and associated with the positions of lines 406*b* and 406*a*, respectively. Note, that as defined in this example, the voltage at the 30% point is $V_{CE}^{max}$. By extrapolation, the lines 408*a* and 408*b* are then located. The abscissa values represented by these lines are, respectively, the 0% and 100% points of the useable fragmentation energy range (and thus limit the range) for the particular m/z value whose fragmentation results are illustrated. More generally, let the UCE (percentage) values that are assigned to the fragmentation maximum and leading edge be denoted as $U_{max}$ and $U_2$, respectively, and let the voltage at the leading-edge point be denoted as $V_2$.

By performing the above-noted steps at several mass values, the variation of $V_{CE}^{max}$ and $V_2$ with the mass variable may be determined and used to determine the values of the coefficients $a_1$, $b_1$, $c_1$ and $a_2$, $b_2$ and $c_2$ in the equations:

$$V_{CE}^{max}=a_1(m/z)^2+b_1(m/z)+c_1 \quad \text{Eq. 2b}$$

$$V_2=a_2(m/z)^2+b_2(m/z)+c_2. \quad \text{Eq. 2c}$$

Then, at any mass, the slope and intercept of a linear equation that provides $V_{CE}$ as a function of a desired UCE value are:

$$\begin{aligned} Slope_{m/z} &= (V_{CE}^{max}-V_2)/(U_{max}-U_2) \\ &= \frac{(a_1-a_2)(m/z)^2+(b_1-b_2)(m/z)+(c_1-c_2)}{(U_{max}-U_2)} \end{aligned} \quad \text{Eq. 3a}$$

$$Intercept_{m/z} = V_{CE}^{max} - Slope_{m/z}\times U_{max} \quad \text{Eq. 3b}$$

so that $V_{CE}$ is given by $$V_{CE}(UCE;m/z)=\text{Intercept}_{m/z}+(\text{Slope}_{m/z}\times UCE) \quad \text{Eq. 4}$$

and, thus, can be set for a desired UCE at any value of mass. Modifications to the above-described method can be envisioned to account for the fragmentation energy dependence of ions having different charge states. For example, the resulting UCE value could be multiplied by a charge state dependent factor which decreases the applied fragmentation energy as charge state increases. Alternatively, different calibrations could be developed for different precursor charge states, in which case the (m/z)-dependence illustrated in the above equations becomes a pure mass-dependence.

Figure 6A:
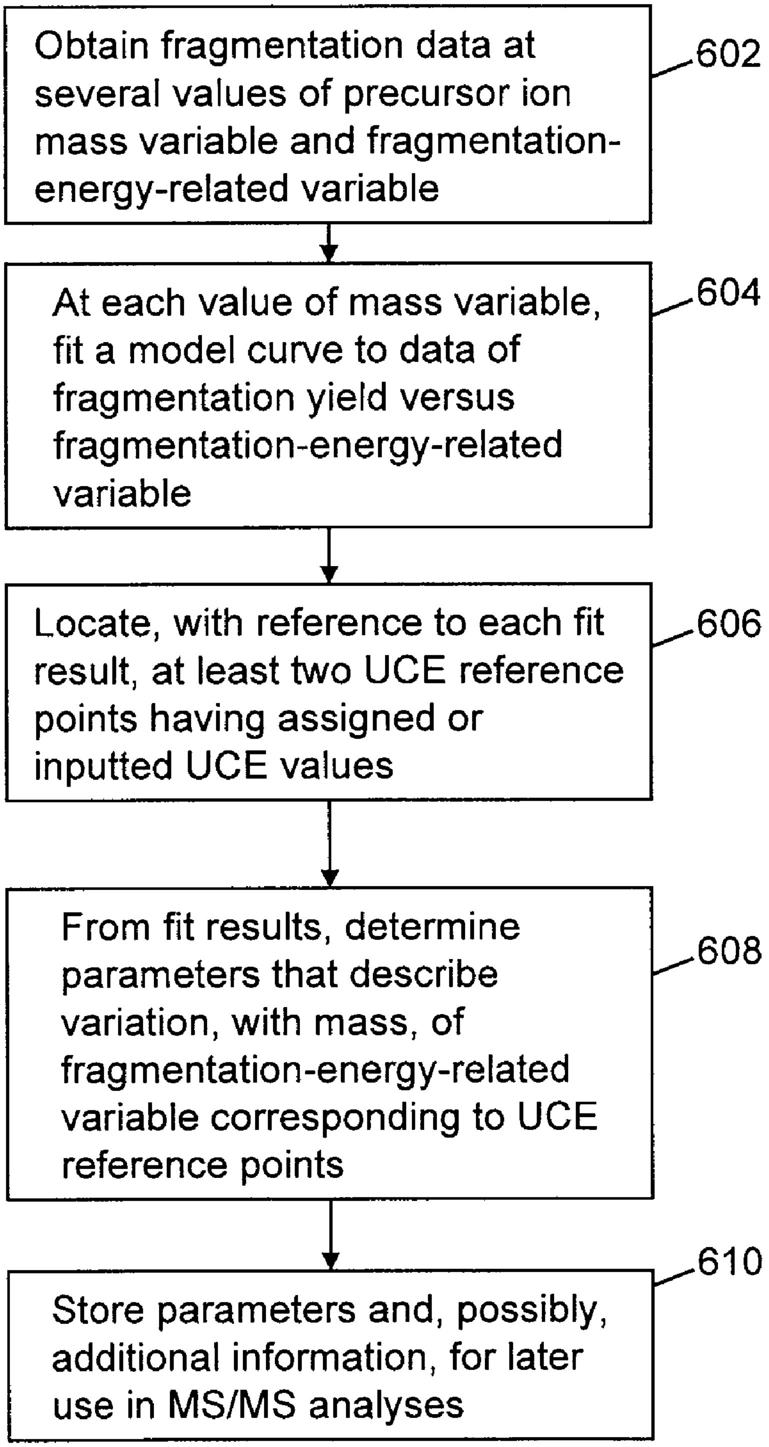
FIG. 6A is a flow chart of a method of calibration of useable fragmentation energy in accordance with the present teachings.

FIG. 6A is a flow chart of a method, in accordance with the present teachings, of calibration of a useable fragmentation energy scale for use in conjunction with a mass spectrometer apparatus. Ordinarily, a method such as the method 600 illustrated in FIG. 6A will be used in conjunction with a particular mass spectrometer prior to performing a set of analyses with the mass spectrometer. Once the useable fragmentation energy scale has been calibrated, another method, such as method 650 shown in FIG. 6B, may be employed so as to apply the calibration to each analysis. Returning to the discussion of FIG. 6A, the first step, step 602 of the method 600 comprises obtaining fragmentation data at several values of a mass variable and at several values of a fragmentation-energy-related variable. In mass spectrometry, the term "mass variable" is most commonly understood as referring to mass-to-charge ratio, m/z, of an ion, where m is the actual mass of the ion and integer z is its charge.

The step 602 of obtaining fragmentation data at several values of the mass variable will generally comprise fragmenting several precursor ions having various different ionic masses. The mass variable need not specifically be mass-to-charge ratio but could actually be mass (if all ionic charges are the same) or could be some mathematical transformation of mass or mass-to-charge. The fragmentation-energy-related variable may be any independently controlled instrumental variable that may be adjusted so as to vary fragmentation energy (or other form of energy) that is imparted to the precursor ions so as to cause ion fragmentation. The fragmentation-energy-related variable may be (or may correspond to) a voltage that is applied to electrodes so as to accelerate ions, or for example, be the energy-per-pulse or continuous-wave power of a laser for doing photodissociation. If the voltage is oscillatory, as in the resonance excitation technique, the relevant fragmentation-energy-related variable may be (or may correspond to) the amplitude of the voltage oscillations.

In step 604 of the method 600, the fragmentation-yield data obtained in step 602 is fit to a mathematical relationship between yield and the fragmentation-energy-related variable. This fitting procedure comprises generating a mathematical model approximation to at least a portion of the fragmentation-yield data, as a function of the fragmentation-energy-related variable. For instance, the Gaussian curve 404 in FIG. 5 is an example of such a model. Although the example illustrates the use of a Gaussian model curve to fit the leading edge of the fragmentation intensity results, it should be kept in mind that alternative model curves or fitted regions could be employed. In step 606 UCE reference points or reference features are located at or assigned to respective values of the fragmentation-energy-related value, at each respective mass. If the reference points or features are related or referenced to parameters calculated during generation of the mathematical model in the prior step, then the assignment and location of these reference points or features can be performed according to a rule in a reproducible fashion. Each UCE reference point or feature has an arbitrarily assigned UCE percentage value, such as UCE=10% or UCE=30% as discussed in reference to the dashed vertical lines 406*a*, 406*b* shown in FIG. 5. Typically, the point corresponding to a value of UCE of 30% will be assigned to the optimum or "best" value of the fragmentation as observed from the data (for instance, the calculated mean of the fit Gaussian curve 404 in FIG. 5). Likewise, the other reference point may be related to the leading edge of the initial rise of fragmentation yield with increasing energy, as also shown in FIG. 5. The second point may be located a certain number of standard deviations away from the calculated mean, may be located at a point where the data exceeds a certain threshold value, or may be defined in some other way. Alternatively, the model curve generation of step 604 could be omitted if reference points or features are determined directly from the fragmentation-yield data in some alternative fashion.

In step 608 of the method 600, results obtained from the fitting procedure performed in the prior step are used to determine parameters that describe the variation, with mass, of the fragmentation-energy-related variable corresponding to the UCE reference points. For instance, this step could include determining the values of the coefficients $a_1$, $b_1$, $c_1$ and $a_2$, $b_2$ and $c_2$ in the equations 2a, 2b so that the variation of the UCE reference points may be calculated at any mass. Examples of the variation with mass of two UCE reference points are given as curves 303, 305 in FIG. 4. Alternatively, other coefficients or parameters may be used in equations having forms other than the polynomials shown herein. Finally, in step 610, the parameters are stored (in computer memory or on a computer readable data storage device) for later use in MS/MS analyses. Other information, such as the values of UCE percentages at the reference points may also be stored, in case these may change from one calibration to another.

Figure 6B:
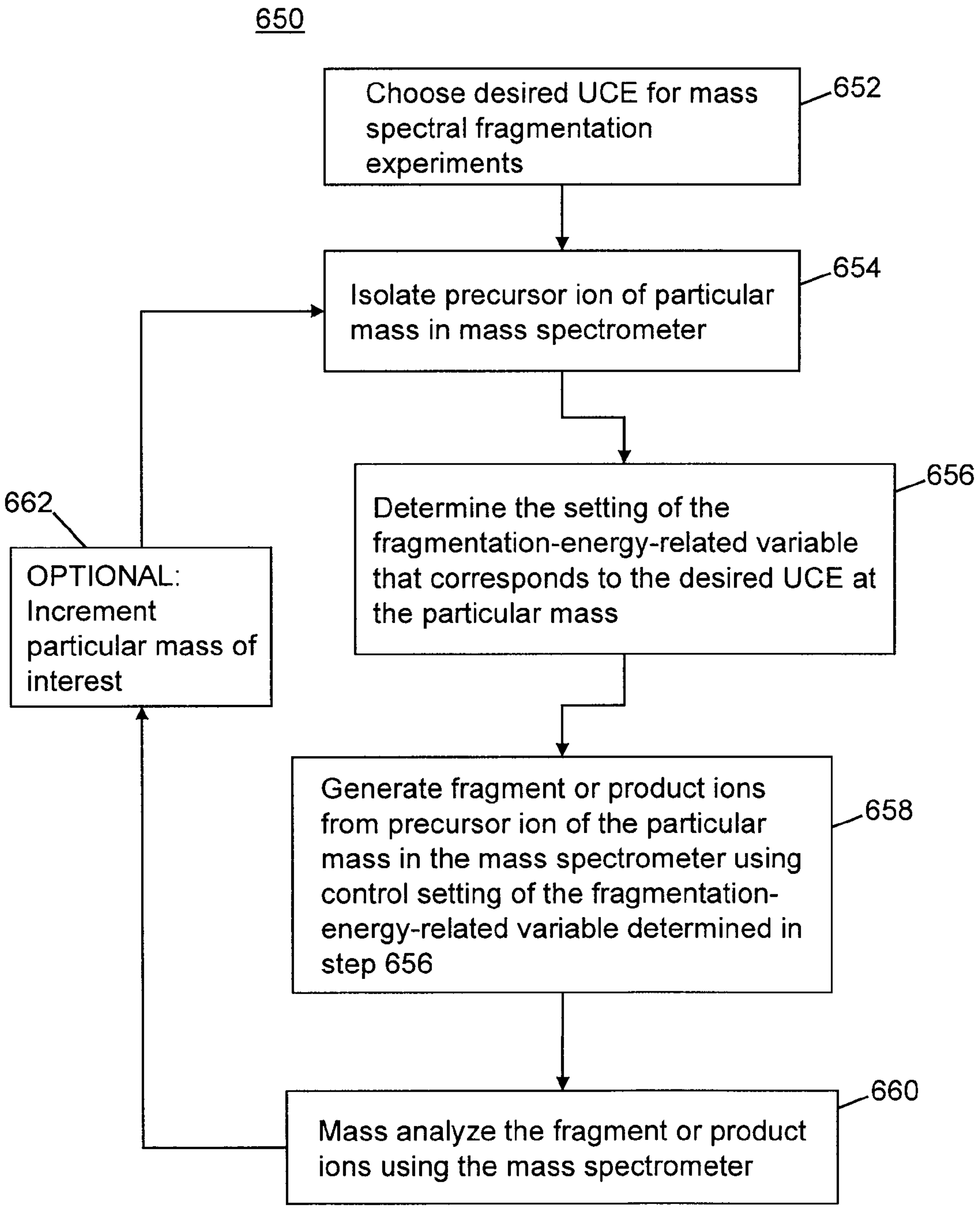
FIG. 6B is a flow chart of a method of fragmenting ions at a desired useable fragmentation energy value in accordance with the present teachings.

FIG. 6B is a flow chart of a method 650 of fragmenting ions at a desired useable fragmentation energy value in accordance with the present teachings. The method 650 should generally be performed using the UCE calibration information derived from the same mass spectrometer system using method 600. In step 652 (FIG. 6B), a mass spectrometer user chooses a desired UCE, as a percentage value, to be used for all precursor ion masses to be fragmented during a mass spectral experiment and analysis. In step 654, precursor ions of a particular mass are isolated in a mass spectrometer using any one of several known techniques. In subsequent step 656, the setting of the fragmentation-energy-related variable that corresponds to the desired UCE at the particular mass is determined, possibly using a method similar to that illustrated in the method 600 of FIG. 6A and Eqs. 3a, 3b and 4 or analogous equations. In step 658, fragment or product ions are derived from the precursor ion of the particular mass in the mass spectrometer using the setting of the fragmentation-energy-related variable determined in step 656. In step 660, the fragment or product ions are mass analyzed using the mass spectrometer. In optional step 658, the particular mass of interest may be changed so as to analyze precursor ions of a different ionic mass. In such a case, steps 654-660 are repeated using the new particular mass of interest.

Figure 7A:
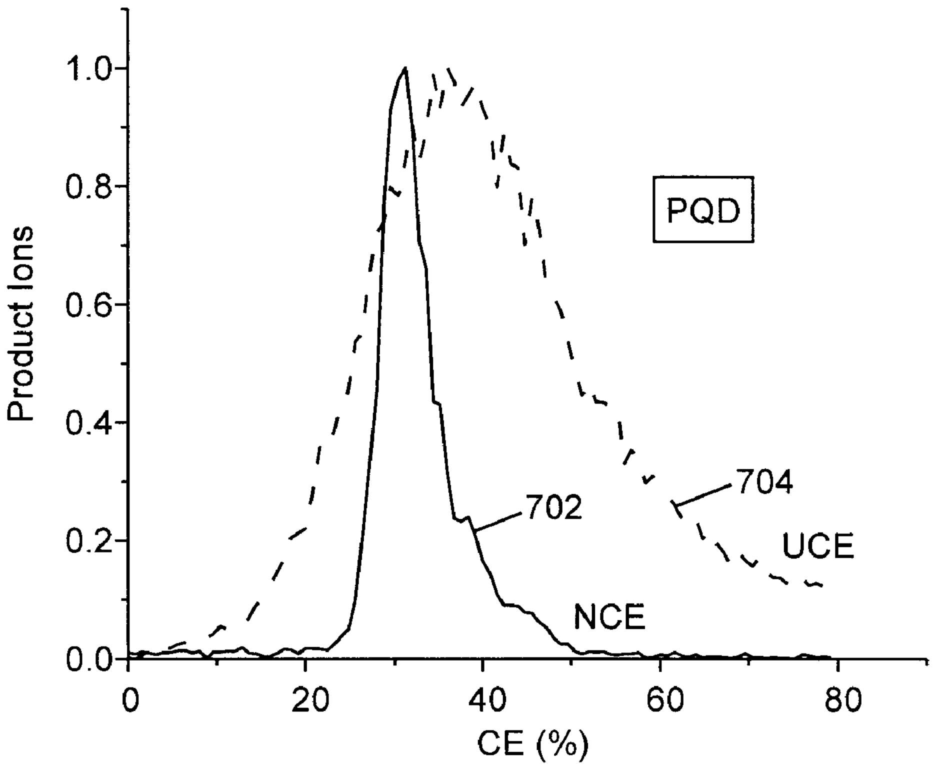
FIG. 7A is a pair of graphs of relative number of detected product ions plotted versus scaled collision energy (either normalized collision energy or normalized useable collision energy, plotted on the same horizontal scale) for fragmentation by PQD.
Figure 7B:
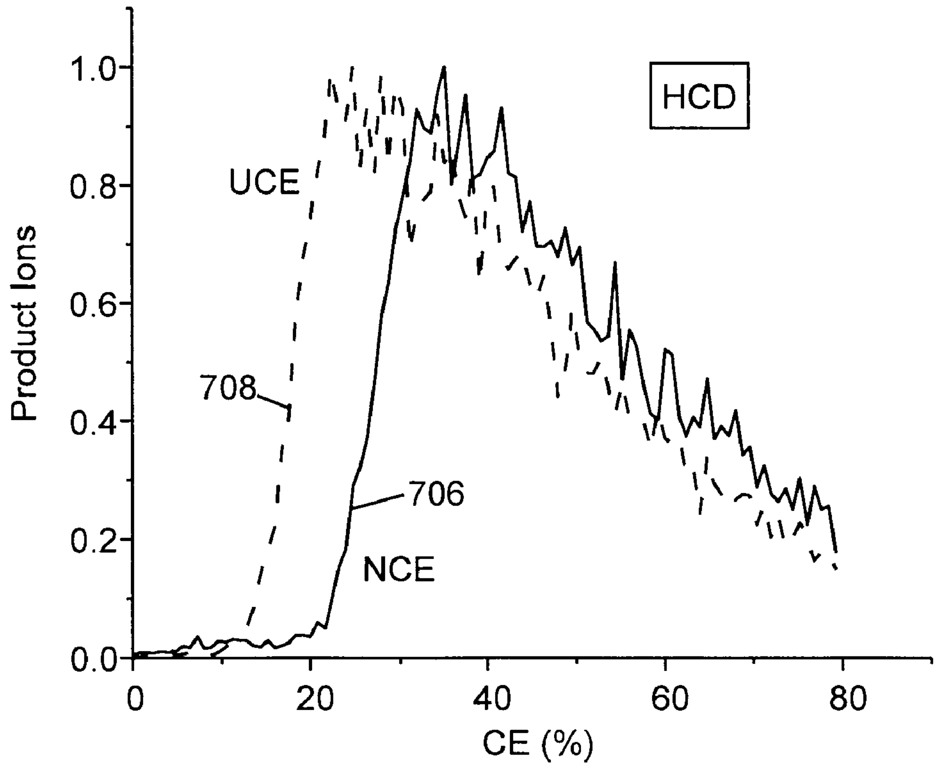
FIG. 7B is a pair of graphs of relative number of detected product ions plotted versus scaled collision energy (either normalized collision energy or normalized useable collision energy, plotted on the same horizontal scale) for fragmentation by high-energy collision-induced dissociation (HCD).

FIGS. 7A and 7B show normalized fragment intensity versus normalized collision energy (either NCE or UCE, plotted on the same scale) for two different MS/MS techniques—pulsed-q dissociation in FIG. 7A and high-energy collision-induced dissociation (HCD) in FIG. 7B. Curve 702 in FIG. 7A and curve 706 in FIG. 7B are plotted versus NCE. Curves 704 and 708 illustrate the same respective experimental data plotted on using a UCE calibration. It may thus be seen from FIGS. 7A and 7B that the use of UCE calibration techniques results in a broadening of the range of useable collision energy values when employing PQD and HCD fragmentation techniques.

One aspect of collision energy calibration for MS/MS that this technique does not address is the fact that despite the general applicability of CID to many ionic species, variations in structure can cause some ions to require more or less voltage than a typical ion at that mass and charge. This problem is fundamentally beyond the scope of this invention, and must be addressed either through the MS/MS technique itself, or other calibration techniques, although this invention still allows adjustability to higher collision energy values required for these particular ions.

The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Accordingly, many modifications may be made by one of ordinary skill in the art without departing from the spirit, scope and essence of the invention. Neither the description nor the terminology is intended to limit the scope of the invention. Any publications, patents or patent application publications mentioned in this specification are explicitly incorporated by reference in their respective entirety.

What is claimed is:

1. A method of calibrating ion fragmentation energy used for fragmenting ions in a mass spectrometer, comprising:

(a) obtaining data on number of fragment ions produced for each of a plurality of precursor ion populations having respective mass-to-charge ratios at each of a plurality of settings of a fragmentation-energy-related variable, said variable being an instrumental variable used to control applied fragmentation energy;

(b) determining, for each mass-to-charge ratio, a respective model curve relating at least a portion of the data on number of fragment ions produced to the fragmentation-energy-related variable, each respective model curve comprising a maximum, and first and second regions in which the value of the model curve continuously decreases as the fragmentation-energy-related variable either increases or decreases away from a point corresponding to the maximum;

(c) determining first and second reference features of the model curve determined at each respective value of the mass-to-charge ratio, the first reference feature relating to the respective maximum, the second reference feature relating to either a fragmentation threshold or to a parameter of the respective model curve;

(d) locating, for each mass-to-charge ratio, first and second reference values of the fragmentation-energy-related variable, each reference value corresponding to a respective reference feature determined at the respective mass-to-charge ratio;

(e) determining, from the plurality of locating steps, the variation, with mass-to-charge-ratio, of each of the reference values of the fragmentation-energy-related variable;

(f) associating each of the reference values of the fragmentation-energy-related variable with respective reference values of a dimensionless useable-fragmentation-energy variable; and (g) storing parameters describing the variation of each of the reference values of the fragmentation-energy-related variable with mass-to-charge ratio, wherein the parameters comprise coefficients of at least one non-linear equation.

2. A method as recited in claim 1, wherein the fragmentation-energy-related variable comprises an amplitude of an auxiliary alternating current voltage that is applied to an ion trap.

3. A method as recited in claim 2, wherein the auxiliary alternating current voltage is applied in conjunction with pulsed-q dissociation of the precursor ions.

4. A method as recited in claim 1, wherein the fragmentation-energy-related variable comprises an accelerating voltage that propels the precursor ions into a collision cell.

5. A method as recited in claim 1, wherein the fragmentation-energy-related variable comprises the energy-per-pulse or continuous-wave power of a laser light to which the precursor ions are exposed.

6. A method as recited in claim 1, wherein the fragmentation-energy-related variable comprises the total time over which the precursor ions are exposed to a light from a light source.

7. A method as recited in claim 1, wherein the second reference value of the fragmentation-energy-related variable that is located for each mass-to-charge ratio is determined from a standard deviation of the data on number of fragment ions produced, said standard deviation taken with respect to the maximum of the model curve determined for the respective mass-to-charge ratio.

8. A method as recited in claim 1, wherein the second reference value of the fragmentation-energy-related variable that is located for each mass-to-charge ratio corresponds to a threshold value of the model curve determined for the respective mass-to-charge ratio.

9. A method as recited in claim 1, wherein the step (e) of storing parameters describing the variation of each of the reference values of the fragmentation-energy-related variable with mass-to-charge ratio comprises storing parameters that are coefficients of at least one polynomial equation.

10. A method as recited in claim 1, wherein the step (e) of storing parameters describing the variation of each of the reference values of the fragmentation-energy-related variable with mass-to-charge ratio comprises storing at least one parameter that is a coefficient or exponent of a power law equation.

11. A method of fragmenting precursor ions comprising a plurality of precursor ion mass-to-charge ratios so as to create fragment ions in a mass spectrometer, comprising:

(a) choosing a value of a dimensionless useable fragmentation energy variable to be referenced for fragmenting the precursor ions, the useable fragmentation energy value representing a normalized fragmentation energy value within an instrumentally allowable range of a fragmentation-energy-related variable used to control applied fragmentation energy, said range varying non-linearly with precursor ion mass-to-charge ratio;

(b) isolating precursor ions of a particular mass-to-charge ratio in the mass spectrometer;

(c) determining a value of the fragmentation-energy-related variable that corresponds to the chosen useable fragmentation energy value at the particular mass-to-charge ratio;

(d) generating fragment or product ions from the precursor ions of the particular mass-to-charge ratio in the mass spectrometer using a control setting of the mass spectrometer corresponding to the determined fragmentation-energy-related variable; and (e) mass analyzing the fragment or product ions using the mass spectrometer.

12. A method as recited in claim 11, wherein the step (c) of determining a value of the fragmentation-energy-related variable that corresponds to the chosen useable fragmentation energy value at the particular mass-to-charge ratio comprises:

(c1) determining a charge state of the isolated precursor ions;

(c2) determining a quantity calculated as the product of the chosen useable fragmentation energy value and a factor that depends on the determined charge state;

(c3) determining the value of the fragmentation-energy-related variable so as to correspond to the determined quantity.

13. A method as recited in claim 11, wherein the step (c) of determining a value of the fragmentation-energy-related variable that corresponds to the chosen useable fragmentation energy value at the particular mass-to-charge ratio comprises:

(c1) inputting at least two reference useable-fragmentation-energy values;

(c2) inputting parameters describing the variation of at least two reference values of the fragmentation-energy-related variable with mass-to-charge ratio, each of the at least two reference values of the fragmentation-energy-related variable associated with a respective one of the at least two reference useable-fragmentation-energy values;

(c3) constructing a linear relationship between the useable fragmentation energy variable and the fragmentation-energy-related variable based on the inputted reference useable-fragmentation-energy values and the inputted parameters; and (c4) calculating the value of the fragmentation-energy-related variable that corresponds to the chosen useable fragmentation energy value at the particular mass-to-charge ratio from the linear relationship.

14. A method of calibrating ion fragmentation energy used for fragmenting ions in a mass spectrometer, comprising:

(a) obtaining data on number of fragment ions produced for each of a plurality of precursor ion populations having respective values of a mass variable at each of a plurality of settings of a fragmentation-energy-related variable, said variable being an instrumental variable used to control applied fragmentation energy;

(b) locating, for each value of the mass variable, reference values of the fragmentation-energy-related variable, each reference value corresponding to a respective reference feature of the data on number of fragment ions produced obtained at the value of the mass variable;

(c) determining, from the plurality of locating steps, the variation, with the mass variable, of each of the reference values of the fragmentation-energy-related variable;

(d) associating each of the reference values of the fragmentation-energy-related variable located for each value of the mass variable with respective reference values of a dimensionless useable-fragmentation-energy variable having a lower bound so as to set up, for each value of the mass variable, a relationship between the useable fragmentation energy variable and the fragmentation-energy-related variable; and (e) storing parameters describing the variation of each of the reference values of the fragmentation-energy-related variable with the mass variable, wherein the lower bound of the useable fragmentation energy variable corresponds to a minimum allowable value of the fragmentation-energy-related variable and wherein the minimum allowable value varies with mass.

15. A method as recited in claim 14, wherein the fragmentation-energy-related variable comprises an amplitude of an auxiliary alternating current voltage that is applied to an ion trap.

16. A method as recited in claim 14, wherein the auxiliary alternating current voltage is applied in conjunction with pulsed-q dissociation of the precursor ions.

17. A method as recited in claim 14, wherein the fragmentation-energy-related variable comprises an accelerating voltage that propels the precursor ions into a collision cell.

18. A method as recited in claim 14, wherein the fragmentation-energy-related variable comprises the energy-per-pulse or continuous-wave power of a laser light to which the precursor ions are exposed.

19. A method as recited in claim 14, wherein the fragmentation-energy-related variable comprises the total time over which the precursor ions are exposed to a light from a light source.

20. A method as recited in claim 14, comprising, prior to the step (b), the additional steps of (a1) determining, for each value of the mass variable, a respective model curve relating at least a portion of the data on number of fragment ions produced to the fragmentation-energy-related variable; and (a2) determining at least one reference feature of the data on number of fragment ions produced obtained at each value of the mass variable from parameters relating to the respective model curve.

21. A method as recited in claim 20, wherein a reference value of the fragmentation-energy-related variable that is located for each value of the mass variable corresponds to the maximum of the model curve determined for the respective mass-variable value.

22. A method as recited in claim 14, wherein a reference value of the fragmentation-energy-related variable that is located for each value of the mass variable corresponds to a threshold level of fragmentation at the respective value of the mass variable.

23. A method as recited in claim 14, wherein the step (e) of storing parameters describing the variation of each of the reference values of the fragmentation-energy-related variable with the mass variable comprises storing parameters that are coefficients of at least one polynomial equation.

24. A method as recited in claim 14, wherein the step (e) of storing parameters describing the variation of each of the reference values of the fragmentation-energy-related variable with the mass variable comprises storing at least one parameter that is a coefficient or exponent of a power law equation.

25. A method of fragmenting precursor ions comprising a plurality of precursor ion mass-to-charge ratios so as to create fragment ions in a mass spectrometer, comprising:

(a) choosing a value of a useable fragmentation energy variable to be referenced for fragmenting the precursor ions;

(b) isolating precursor ions of a particular mass-to-charge ratio in the mass spectrometer;

(c) calculating a value of the fragmentation-energy-related variable that corresponds to the chosen useable fragmentation energy value at the particular mass-to-charge ratio, said calculating utilizing inputted parameters describing the variation of reference values of the fragmentation-energy-related variable with mass-to-charge ratio, wherein said parameters are previously determined and stored according to a method of calibrating ion fragmentation energy as recited in claim 1;

(d) generating fragment or product ions from the precursor ions of the particular mass-to-charge ratio in the mass spectrometer using a control setting of the mass spectrometer corresponding to the determined fragmentation-energy-related variable; and (e) mass analyzing the fragment or product ions using the mass spectrometer.

* * * * *